(12) United States Patent
Maier-Hunke

(10) Patent No.: US 6,234,707 B1
(45) Date of Patent: May 22, 2001

(54) COMPONENT GROUP

(75) Inventor: Horst-Werner Maier-Hunke, Iserlohn (DE)

(73) Assignee: "Durable" Hunke & Jochheim GmbH & Co. KG, Iserlohn (DE)

( * ) Notice: Subject to any disclaimer, the term of this patent is extended or adjusted under 35 U.S.C. 154(b) by 0 days.

(21) Appl. No.: 09/341,390
(22) PCT Filed: Jan. 23, 1998
(86) PCT No.: PCT/DE98/00283
  § 371 Date: Jul. 7, 1999
  § 102(e) Date: Jul. 7, 1999
(87) PCT Pub. No.: WO98/32974
  PCT Pub. Date: Jul. 30, 1998

(30) Foreign Application Priority Data

Jan. 24, 1997 (DE) .............................. 197 03 751

(51) Int. Cl.⁷ ........................................ E02B 3/00
(52) U.S. Cl. .............................. 403/331; 403/339
(58) Field of Search ................... 403/331, 339, 403/340, 363, 364

(56) References Cited

U.S. PATENT DOCUMENTS

| | | | |
|---|---|---|---|
| 4,155,664 | * | 5/1979 | Acheson .................. 403/331 X |
| 5,183,278 | * | 2/1993 | Wade, Jr. .................. 403/331 X |
| 5,692,722 | * | 12/1997 | Lundagards .................. 403/331 X |

FOREIGN PATENT DOCUMENTS

| 937493 | 1/1956 | (DE) . |
|---|---|---|
| 2174320 | 10/1973 | (FR) . |

OTHER PUBLICATIONS

"Symmetrical Oil Containment Boom Connector" Campbell, F.J.—Navy Technical Disclosure Bulletin vol. 1, No. 1, May 1976, pp. 15–19.

* cited by examiner

Primary Examiner—Lynne H. Browne
Assistant Examiner—John R. Cottingham
(74) Attorney, Agent, or Firm—Mark P. Stone

(57) ABSTRACT

A component group for providing support elements has two end pieces (3, 4), and at least one intermediate piece (1 or 2) which can be fitted together with the end pieces. The joints between the end pieces and the intermediate piece are configured so that the end pieces, which each have on one side only at least one rib (6) and at least one groove (5), are interchangeable.

6 Claims, 1 Drawing Sheet

COMPONENT GROUP

TECHNICAL FIELD

The invention relates to a component group consisting of a plurality of parts which can be fitted together, in which each of the sides, which are to be connected to one another, of the parts has at least one undercut groove and a web, and in which the shape and position of the grooves and webs which can be brought into engagement with one another are coordinated with one another in such a manner that by means of an imaginary 180° pivoting in each case of one of two respectively adjacent parts about an axis placed between the parts and running parallel to the grooves and webs, the grooves and webs of the parts can be transferred into a congruent position.

PRIOR ART

FR 21 74 320 A discloses a component group which consists of two identical components, has plug-in connections and whose parts have grooves and webs on opposite sides. The parts used in the known component group are not suitable for forming component groups which consist of at least one intermediate part and two identical end parts which are provided with connecting elements on just one side.

Also, "Navy Technical Disclosure Bulletin vol. 1, No. 1, May 1976, p. 15" discloses an oil block having plug-in connections which have grooves and webs but which are not suitable for producing a stand, since their connecting points are of hinged design.

SUMMARY OF THE INVENTION

The invention is based on the object of providing a component group of the generic type, which is under consideration and consists of a plurality of parts, in which identical end parts are joined to an intermediate part or to a plurality of likewise identical intermediate parts. According to the invention, this object is achieved in that the component group forms a stand which consists of two end parts and at least one intermediate part arranged between said end parts, and in that the . . . with at least one groove and at least one web on just one side arranged between said end parts, and in that the end parts, which are provided with at least one groove and at least one web on just one side, are designed such that they can be interchanged.

Further details and features of the invention are revealed in the subclaims and in the following description of a plurality of embodiments illustrated in the attached drawing.

WAYS OF IMPLEMENTING THE INVENTION

Figure 1:
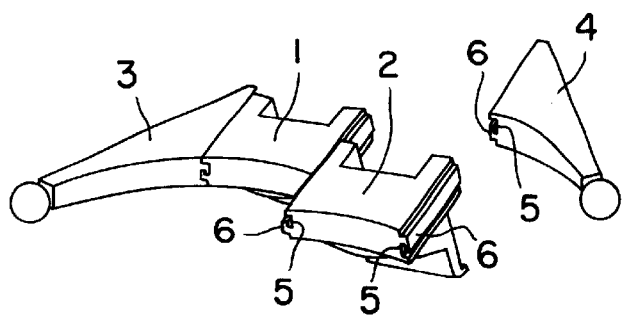
FIG. 1 shows a component group which consists of two identical intermediate parts and two identical end parts and which forms a stand.
Figure 1:
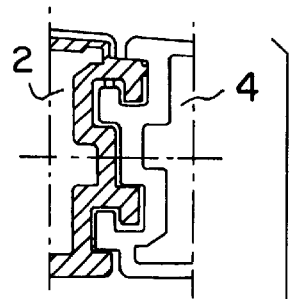

In the assembly according to FIG. 1, which forms a stand, two identical intermediate parts 1, 2 are connected to one another and to two likewise identical end parts 3, 4. On each of their opposite sides, the intermediate parts 1, 2 each have a groove 5 and a web 6, while the end parts 3, 4 are provided with a groove 5 and a web 6 on just one side. It can be seen that the two end parts 3, 4 can be connected to the intermediate parts 1, 2 both on the left side and on the right side thereof. Only the end part 4, for example, needs to be pivoted through 180° about an axis running parallel to the web 6 in order to transfer it into a position corresponding to the position of the end parts 3.

Figure 2:
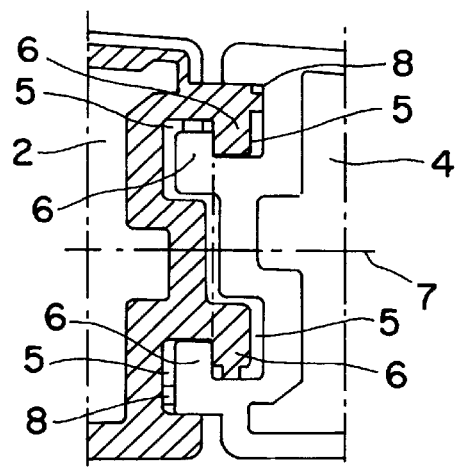
FIG. 2 shows a particularly expedient plug-in connection for component groups of the type illustrated in FIG. 1.
Figure 3:
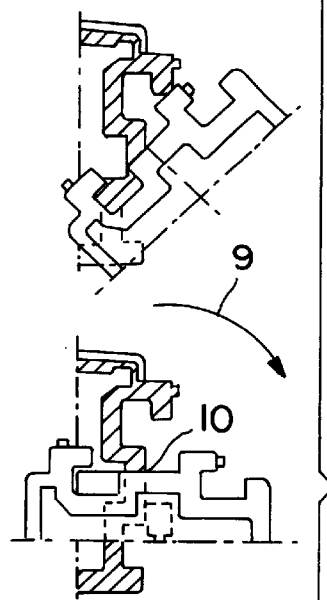
FIG. 3 shows the configuration of the grooves and webs, which correspond with one another, of the plug-in connection according to FIG. 2.
Figure 3:
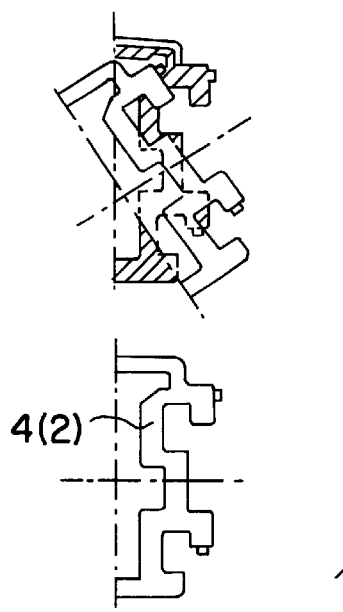

FIG. 2 shows a particularly advantageous plug-in connection. In this case, the sides, which are to be connected to one another, of two parts 2 and 4 are in each case provided with two grooves 5 and webs 6 arranged at a distance from a common central line 7, the webs 6 having projections designed as position-fixing dogs 8. As can be seen by reference to FIG. 3, the grooves 5 and webs 6 are shaped in such a manner that their contours are concealed or overlap if the grooves and webs, for example, of the part 4 are pivoted, in the direction of the arrow 9, through 180° about an axis 10 placed between the parts and running parallel to the grooves 5 and webs 6.

Figure 4:
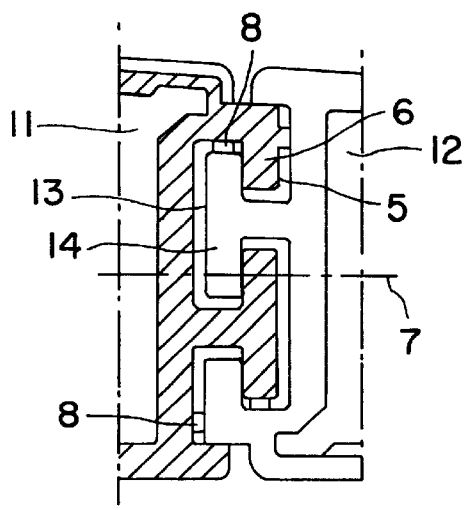
FIG. 4 shows a modified component group.

The shape of the grooves and webs can vary. Thus, FIG. 4 shows a connection of two parts 11 and 12, in which in addition to grooves 5 and webs 6 of the above-described type, wider grooves 13 and webs 14 are used.

What is claimed is:

1. Component group consisting of a plurality of parts which can be fitted together, in which each of the sides, which are to be connected to one another, of the parts has at least one undercut groove and a web, and in which the shape and position of the grooves and the webs can be brought into engagement with one another are coordinated with one another such that by means of an imaginary 180° pivoting in each case of one of two respectively adjacent parts about an axis placed between the parts and running parallel to the grooves and the webs, the grooves and the webs of the parts can be transferred into a congruent position, characterized in that said component group forms a stand which consists of two end parts (3, 4) and at least one intermediate part (1, 2) arranged between said end parts (3, 4), that each said intermediate part is provided with at least one said groove (5) and at least one said web (6) on each of its opposite sides, that each said end part (3, 4) is provided with at least one said groove (5) and at least one said web (6) on only one of said sides, that said end parts (3, 4) and said at least one intermediate part (1, 2) are arranged in a row, and that said end parts (3, 4) are interchangeable.

2. Component group according to claim 1, characterized in that each of the sides, which are to be connected to one another, of the parts to be joined together has in each case two said grooves (5) which are arranged at a first predetermined distance from one another and two said webs (6) which are arranged at a second predetermined distance from one another perpendicularly to a common central line (7) of the parts and which are aligned with one another.

3. Component group according to claim 2, characterized in that said grooves (5) are arranged on both sides of the common central line (7) of the parts (3,1; 1,2; 2,4) connected to one another.

4. Component group according to claim 1 characterized in that the webs (6) are provided with position-fixing dogs (8).

5. Component group according to claim 2, characterized in that the webs (6) are provided with position-fixing dogs (8).

6. Component group according to claim 3, characterized in that the webs (6) are provided with position-fixing dogs (8).

* * * * *